United States Patent [19]

Whiteside

[11] Patent Number: 4,968,772
[45] Date of Patent: * Nov. 6, 1990

[54] PROCESS FOR THE PREPARATION OF UREA-FORMALDEHYDE RESINS

[75] Inventor: Ian R. Whiteside, Linton, England

[73] Assignee: Dyno Industrier AS, Oslo, Norway

[*] Notice: The portion of the term of this patent subsequent to May 3, 2010 has been disclaimed.

[21] Appl. No.: 275,036

[22] PCT Filed: Jul. 18, 1987

[86] PCT No.: PCT/EP87/00392
  § 371 Date: Sep. 19, 1988
  § 102(e) Date: Sep. 19, 1988

[87] PCT Pub. No.: WO89/00587
  PCT Pub. Date: Jan. 26, 1989

[51] Int. Cl.$^5$ .............................................. C08G 12/12
[52] U.S. Cl. .................................... 528/230; 528/232; 528/239; 528/242; 528/259
[58] Field of Search ............... 528/230, 232, 239, 242, 528/259

[56] References Cited

U.S. PATENT DOCUMENTS

| | | | |
|---|---|---|---|
| 3,830,783 | 8/1974 | Varglu et al. | 523/348 |
| 3,842,039 | 10/1974 | Varglu et al. | 523/348 |
| 3,962,166 | 6/1976 | Gordon | 524/843 |
| 4,032,515 | 6/1977 | Blommers et al. | 528/155 |
| 4,174,310 | 11/1979 | Hubbard | 523/340 |
| 4,247,433 | 1/1981 | Schamberg et al. | 524/843 |
| 4,247,433 | 1/1981 | Schamberg et al. | 524/843 |
| 4,381,368 | 4/1983 | Spurlock | 524/598 |
| 4,410,685 | 10/1983 | Williams | 528/259 |

FOREIGN PATENT DOCUMENTS

| | | |
|---|---|---|
| 0038180 | 10/1981 | European Pat. Off. . |
| 1376385 | 12/1974 | United Kingdom . |
| 1376388 | 12/1974 | United Kingdom . |
| 1420017 | 1/1976 | United Kingdom . |
| 1421994 | 1/1976 | United Kingdom . |
| 1480787 | 7/1977 | United Kingdom . |
| 1486342 | 9/1977 | United Kingdom . |
| 1513409 | 6/1978 | United Kingdom . |

*Primary Examiner*—John Kight, III
*Assistant Examiner*—Sam A. Acquah
*Attorney, Agent, or Firm*—Wenderoth, Lind & Ponack

[57] ABSTRACT

Urea-formaldehyde resins which may be cured to give products having a low total extractable formaldehyde content are prepared by the following process:
  (i) aqueous 30–50% formaldehyde and urea are mixed in a formaldehyde:urea molar ratio of 2–3:1 at pH 6–11,
  (ii) this mixture is heated to at least 50° C., preferably to at least 80° C.,
  (iii) a mineral or organic acid is added to bring the mixture to pH 0.5–3.5,
  (iv) the mixture is heated at a temperature between 80° C. and the reflux temperature, preferably for 15 minutes to 1 hour,
  (v) keeping the temperature at or above 80° C., a base is added to bring the mixture to pH 6.5–9 and
  (vi) urea is added until the formaldehyde:urea molar ratio is within the range 0.8–8:1.

In a modification of the process, solid particulate resins are obtained by reacting the mixture from step (v) with urea at a pH below 7 to increase the viscosity thereof, adding a base until the mixture reaches a pH of 6.5–9 and dehydrating the resulting mixture.

20 Claims, No Drawings

PROCESS FOR THE PREPARATION OF UREA-FORMALDEHYDE RESINS

This invention relates to a new process for the preparation of urea-formaldehyde resins having a low extractable formaldehyde content.

Urea-formaldehyde resins are widely used in industry as binders for the production of wood-based materials, particularly chipboard, plywood, and various fibreboards. They are usually employed as colloidal aqueous solutions having a 60–70% solids content, the solids content being the percentage weight left when a 2 g sample of the resin is heated at atmospheric pressure at 120° C. for 3 hours.

The resins themselves are complex mixtures of various condensation products, ranging rom simple methylolated ureas to fairly high molecular weight materials, and the precise properties of any particular resin will depend upon its molar ratio (i.e. the ratio of formaldehyde to urea used in its manufacture), the type and proportion of the various linkages within the resin structure, and the proportions of high and low molecular weight material. These last two factors are dependent upon the precise manufacturing method that is used.

Conventional commercial resins all liberate a certain amount of formaldehyde during hot curing and after cure has taken place. The latter liberation of formaldehyde can be a serious problem since it limits the use to which, for example, fibreboards and particle boards may be put. A board that liberates formaldehyde above a specified level cannot be used in unventilated areas. The measurement of the total extractable formaldehyde is therefore an important test that is carried out on fibreboard and particle board samples, and is usually effected using the method of the Federation Europeenne des Syndicates des Fabricants des Panneaux de Particules (FESYP) and described in British Standard 1811. In this test small rectangular blocks sawn from air-dried fibreboard or particle board are extracted with toluene, the toluene is washed with water, and the water measured iodometrically for formaldehyde. A need exists for resins that have a very low content of extractable formaldehyde but which, in all their performance properties, behave like a conventional urea-formaldehyde resin.

The conventional method of manufacturing urea-formaldehyde resins comprises precondensing urea with formaldehyde in aqueous solution at the reflux at pH 7–9, and heating the mixture at pH 5–6 until the desired degree of water insolubility or viscosity is reached. The product is neutralised and may then be evaporated and blended with a further quantity of urea if desired. Such conventional resins usually have a F:U molar ratio within the range 1.3–2.3:1.

Resins having a F:U molar ratio as low as 1:1 have been described in British Patent Specification No. 1 420 017. These resins are said to be suitable for binding wood-based materials and are prepared by (i) condensing formaldehyde and urea at a F:U molar ratio of at least 3:1 and at pH 3 or less, (ii) adding urea to bring the molar ratio down to 2–2.75:1, and continuing to heat at pH 3 or less (iii) optionally, adding more urea so that the final molar ratio is within the range 1–2.75:1, (iv) adjusting the pH to 5–6.5 or to 8–10, and continuing the heating until the desired product is formed. This product may then be concentrated or dried, if desired.

A serious drawback with this process is that, on an industrial scale, it is difficult to obtain a consistent product and there is a serious risk of the product forming an intractable gel during the process, such formation then requiring dismantling of the apparatus in order for it to be cleaned. Further, when the product has been made successfully, it has poor 'wash down' properties. This means that pipework, pumps etc. through which the resin has been passed are difficult to clean, due to the inherent stickiness of the resin.

Another process for preparing adhesive resins with low formaldehyde content is described in U.S. Pat. No. 4,410,685. In this process resins having a F:U molar ratio within the range 1.0 to 1.2:1 are prepared as follows:

(i) formaldehyde solution is acidified to pH 0.5–2.5, (ii) the acid solution is heated to 50°–70° C., (iii) urea is added slowly until the F:U molar ratio reaches 2.9 to 3.1:1.

(iv) when the mixture reaches a given viscosity it is neutralised, and (v) urea is added to give a F:U molar ratio 1.0 to 1.2:1.

Like the previous process described, this process is difficult to control, especially on an industrial scale and unless careful control is maintained over the reaction the resin will gel during the condensation stage if the conditions that are described are strictly followed.

It has now been found that urea-formaldehyde resins having a low content of total extractable formaldehyde and which are suitable for bonding wood-based products, such as fibreboard or particleboard, may be prepared with a minimal risk of forming intractable gels if the urea is first methylolated under alkaline conditions at elevated temperature and in a F:U molar ratio within the range 2:1 to 3:1, this mixture is then acidified to a low pH and condensation allowed to continue at elevated temperature. The mixture is neutralised and, in either order, it is concentrated if necessary and urea is added to adjust the F:U molar ratio to within the range 1.8 or less:1. This process facilitates formation of a resin which is water soluble and which, when freshly prepared, is completely transparent in appearance. This transparency is lost gradually on storing, the resin becoming slowly opalescent, so that examination of the turbidity of the resin gives an immediate indication of its age or storage conditions.

Accordingly, this invention provides a process for the preparation of urea-formaldehyde resins which comprises (i) mixing an aqueous formaldehyde solution containing 30–50% by weight of formaldehyde with urea at a formaldehyde:urea molar ratio of 2 to 3:1 and at pH 6–11, (ii) heating the mixture to at least 50° C., (iii) adding an acid until the mixture reaches a pH within the range 0.5–3.5, (iv) heating the mixture at a temperature between 80° C. and the reflux temperature, (v) with the mixture at a temperature of at least 80° C., adding a base until the mixture reaches a pH within the range 6.5–9, and (v) adding urea until the formaldehyde:urea molar ratio is within the range 0.8–8:1.

For use as a binder for particle boards or fibreboards, the urea-formaldehyde resin should have a solids content of 40 to 75%. If it is necessary to evaporate the mixture in order to achieve such a solids content, the evaporation may be carried out, under reduced pressure, either between stages (v) and (vi) or after stage (vi).

The initial mixing of formaldehyde solution, usually containing 35-40% by weight of formaldehyde, and urea usually takes place at a F:U molar ratio within the range 2.2 to 2.8:1, especially 2.3 to 2.5:1, and at pH 7-9. This mixture is then heated to at least 50° C., usually to at least 80° C. and preferably to reflux. An acid is then added to bring the pH of the mixture to below 3.5, generally not above 3 and preferably within the range 1-2.5. The acid is preferably added while maintaining gentle reflux to keep the exothermic reaction under control. The type of acid used is not critical—inorganic or organic acids have both been found to be suitable. Typical acids that may be used include trichloroacetic, toluene-p-sulphonic, hydrochloric, sulphuric, sulphamic and phosphoric acids.

Heating of the acid mixture in step (iv) is preferably effected at reflux temperature; this heating is usually carried out for a period of from 1 minute to 2 hours, especially from 15 minutes to 1 hour. The temperature of the reaction mixture may be allowed to fall slightly, but this increases the risk of intractable gel formation, particularly when a formaldehyde:urea ratio up to 2.6:1 is used. In general, the temperature below which the reaction mixture should not be allowed to fall depends on the formaldehyde:urea ratio employed, lower ratios requiring higher temperatures to be maintained. When the formaldehyde:urea ratio is up to 2.6:1, the reaction mixture is preferably maintained under reflux until the acid condensation stage (iv) has been terminated by the addition of the base in step (v). Heating of the reaction mixture in steps (ii), (iv) and (v) may be carried out under pressure, in which case the reflux temperature is, of course, higher and the respective heating time can generally be reduced.

For reasons of economy, the base which is used in step (v) is usually sodium hydroxide or potassium hydroxide, but any base that will raise the pH of the mixture to within the range 6.5 to 9 is satisfactory.

When the desired pH has been reached, the mixture is usually partially evaporated under reduced pressure to eliminate some of the water present, although this evaporation may take place after the further addition of urea. Evaporation is usually effected below 50° C. and preferably within the range 35°-45° C. The solids content of the product from this evaporation may be varied within fairly wide limits, depending upon the ultimate use of the final resin, but is usually within the range 50-65% by weight if the evaporation precedes urea addition, and 60-70% by weight if it follows urea addition. When the desired solids content has been reached, the mixture is usually cooled to a temperature below 50° C., preferably to within the range 25°-45° C., before urea is added in step (vi). The mixture is usually stirred for 15 to 60 minutes following addition of urea. Addition of urea gives the desired F:U molar ratio, preferably from 1.0 to 1.7:1, especially 1.2 to 1.5:1.

The process of the invention may be carried out batchwise or continuously. Resins made by this new process have their formaldehyde firmly bonded into the molecule, so that both the uncured and cured resins give low values for available formaldehyde. This may be shown by measuring the total free formaldehyde from the uncured resin, the liberated formaldehyde from the hot curing of fibreboard or particle board, and the total extractable formaldehyde from cured fibreboard or particle board.

By means of the process of the present invention, resins having remarkably good washdown properties can be prepared, so that apparatus which has been used for the uncured resin may be cleaned easily with a jet of cold water, as can any spillages. This is an important consideration in an industry where large quantities of resin are handled and, if the resin residues are allowed to remain and harden, an expensive strip-down of equipment is needed for cleaning.

The present invention also facilitates the production of resins having remarkable clarity when freshly prepared. Resins having F:U molar ratios of 1.8 or less have always been opalescent, or more usually thick white liquids. To make such resins as clear, transparent liquids allows an instant visible means of checking that the resin made by this process has been supplied and that contamination by other materials has not taken place.

These advantages can be achieved with no loss of strength in the resin. Products made using this resin, such as fibreboard and particleboard, generally having the strength which could be expected from products made with a conventional resin having the same solids content and F:U molar ratio.

Resins made by the process of this invention are particularly useful in the production of products known as medium density fibreboards, facilitating good processability and high production rates and showing good resistance to prematrue cure in blending operations.

These resins may be cured by any conventional means, usually by heating or by the addition of an acid hardener which cures the resins at ambient temperatures, such as formic, phosphoric, or hydrochloric acid, or using a heat-activated hardener such as an acid salt that liberates an acid when heated, preferably ammonium chloride.

Resins prepared by the process of the invention are useful in bonded lignocellulosic material, especially fibreboard or particleboard, the bonded material comprising the resin in cured form as a binder. A process for bonding two lignocellulosic surfaces together comprises applying to at least one of the surfaces a urea-formaldehyde resin prepared by the process of the invention, and holding the surfaces together while curing the resin. In a particular embodiment of this process, fibreboard or particle board is produced by mixing lignocellulosic fibres or particles, preferably of wood, together with a binder comprising a urea-formaldehyde resin prepared by the process of the invention and, optionally, a heat-activated hardener therefor and heating the resulting mixture under pressure until the binder is cured. The optional heat-activated hardener can be any conventional heat-activated hardener for urea-formaldehyde resins, such as an acid salt which liberates an acid on heating, preferably ammonium chloride. In general, no hardener is used in the production of fibreboard, while the hardener is used in the manufacture of particleboard. The fibreboard or particleboard can be formed in a conventional press, using conventional curing conditions. Conventional additives, such as a wax emulsion to improve moisture resistance of the product, can be included in the mixture of lignocellulosic material and binder.

The process of the invention as hereinbefore defined may be modified to produce resins in a solid particulate form. After step (v), instead of adding urea to give a resin having a formaldehyde:urea molar ratio of 0.8:1 to 1.8:1, the mixture from step (v), preferably after evaporation as hereinbefore described, is reacted with urea under acid conditions to give a higher molecular weight resin which is then neutralised and dehydrated to give a solid, particulate resin.

Accordingly, the invention also provides a modification of the process as hereinbefore described which comprises (a) carrying out steps (i) to (v) as hereinbefore described, (b) reacting the mixture from step (v) with urea at a pH below 7 to increase the viscosity thereof, (c) adding a base until the mixture reaches a pH within the range 6.5–9, and (d) dehydrating the mixture to form a solid particulate resin.

The reaction of the mixture from step (v) with urea is usually carried out at a pH of 3 to 5 and a temperature of 30 to 60° C., using urea in an amount sufficient to give the reaction mixture a formaldehyde:urea molar ratio of from 1.3:1 to 1.9:1, until the viscosity of the reaction mixture is 2 to 4 times the initial viscosity of the mixture. Preferably this reaction is carried out at a pH of 3.5 to 4.5 and a temperature of 35° to 50° C., using urea in an amount sufficient to give the reaction mixture a formaldehyde:urea molar ratio of 1.5:1 to 1.7:1, until the viscosity of the reaction mixture is 2.5 to 3.5 times the initial viscosity of the mixture. Preferably also, the mixture from step (v) is evaporated to a solids content of 40–65%, preferably 50–60%, by weight, for example by a method as hereinbefore described, before reaction with the urea.

Acids suitable for use in reducing the pH of the mixture from step (v) include those hereinbefore mentioned as suitable for use in step (iii). Any base that will raise the pH of the mixture to within the range 6.5 to 9 can be used in step (c); for reasons of economy, sodium hydroxide and potassium hydroxide are preferred.

The dehydration step (d) can be carried out in a conventional spray drier to form the particulate resin. By means of the process of the invention, particulate resins having low values for available formaldehyde, both in the uncured and cured state, can be obtained, these resins having excellent tack properties and being particularly suitable for use in binders for particle board, wafer board and plywood.

For use as a binder, the particulate resin may be mixed with a solid hardener therefor and optionally with additives, e.g. fillers such as wood flour and china clay, to give a storage-stable composition known as a "one-shot" composition which can be activated by the addition of water. Suitable solid hardeners for use in such "one-shot" compositions are well-known; aluminium sulphate is the most generally used material. Alternatively, the particulate resin may be dissolved or dispersed in water to form, in effect, a liquid resin which can be mixed with a hardener therefor and optionally with additives for use as a binder. Conventional hardeners such as the acid and salt hardeners hereinbefore mentioned, can be used.

The invention is illustrated by reference to the following Examples in which all parts and percentages are by weight unless otherwise indicated. "w/v" indicates weight by volume. The solids contents are determined by heating a 2 g sample at 120° C. for 3 hours under atmospheric pressure.

EXAMPLE 1

Aqueous formaldehyde solution (23.93 kg; 38.56% HCHO) is treated with sodium hydroxide solution (76.4 ml; 10% w/v NaOH), and urea (7.69 kg). The mixture, which is of pH 9 and has a F:U molar ratio of 2.40:1, is stirred and heated to reflux. It is allowed to cool slightly, to 98° C., and an aqueous solution of sulphamic acid (343.6 ml; 20% $NH_2SO_3H$) is added. The resultant mixture is of pH 2.0, and this is heated under reflux for 30 minutes.

Whilst maintaining the reflux, sodium hydroxide solution (509.8 ml; 10% w/v NaOH) is added to give a neutral solution (pH 7). This is allowed to cool to about 40° C., at which temperature a vacuum is applied and water is distilled from the mixture, a total of 11.3 kg water being collected. The solids content of the mixture is 59%. Finally a further quantity of urea is added (5.40 kg), giving a F:U molar ratio of 1.41:1.

This resin is a water-soluble, colourless transparent liquid having the following properties:

| Solids content | 65% |
|---|---|
| Viscosity at 25° C. | 0.27 Pa s |
| Free formaldehyde | 0.3% |

EXAMPLE 2

Aqueous formaldehyde solution (75.68 g; 38.56% HCHO) is treated with sodium hydroxide solution (0.24 ml; 10% w/v NaOH) followed by urea (24.32 g). The mixture, which is of pH 9 and has a F:U molar ratio of 2.40:1, is stirred and heated to reflux. Phosphoric acid solution (5.0 ml; 20% $H_3PO_4$) is added, to bring the mixture to pH 2.0, and it is then heated under reflux for 30 minutes. Neutralisation with sodium hydroxide solution (20%) follows and the mixture is evaporated at about 40° C. to a solids content of 60%. The mixture is cooled and urea (17.08 g) is added, giving a F:U molar ratio of 1.41:1.

This resin is a water-soluble, colourless transparent liquid having the following properties:

| Solids content | 71% |
|---|---|
| Viscosity at 25° C. | 1.72 Pa s |

EXAMPLE 3

Softwood core ships (1540 g), dried to a moisture content of 2%, are blended with a mixture comprising the resin described in Example 1 (173.8 g), ammonium chloride solution (12.0 g; 10% $NH_4Cl$), a commercial wax emulsion (12.0 g; 65% wax), and water (65.0 g). Part of the resultant blend (1650 g) is placed within a wooden frame 355 mm square, and consolidated at room temperature under a pressure of 791 kPa. The resultant consolidated sheet is removed from the frame and compressed at 145° C. for 8 minutes under a pressure of 2.77 MPa. The resultant chipboard has a thickness of 19 mm. The board is tested, with the following results:

| F:U molar ratio | 1.41:1 |
|---|---|
| Resin content of board (% solids) | 8 |
| Density (kg/m$^3$) | 667 |

-continued

| | |
|---|---|
| Modulus of rupture (mPa) | 21.57 |
| Transverse tensile strength (mPa) | 0.90 |
| Total extractable formaldehyde (%) | 0.013 |

It may therefore be seen that the total extractable formaldehyde, measured in accordance with BS 1811, in the board is extremely low.

EXAMPLE 4

Aqueous formaldehyde solution (75.68 g; 38.56% HCHO) is treated with sodium hydroxide solution (0.24 ml; 10% w/v NaOH) and urea (24.32 g). This mixture, which is of pH 9 and has a F:U ratio of 2.40:1, is heated to reflux and sulphamic acid (1.2 ml; 15% $NH_2SO_3H$) is added, giving the mixture a pH of 2.0. The mixture is then heated under reflux for 30 minutes after which, while the reflux is maintained, aqueous NaOH is added to pH 7. After cooling to 25° C., urea (17.08 g) is added, and the product evaporated in vacuo below 40° C. to a final weight of 81.12 g.

The product is a colourless, transparent resin having an F:U molar ratio of 1.41:1, a solids content of 68.5%, and a viscosity at 25° C. of 0.58 Pa s.

EXAMPLE 5

Aqueous formaldehyde solution (748.3 g: 38.68% HCHO) is treated with sodium hydroxide solution (1.2 ml; 20% w/v NaOH) and urea (251.7 g). The mixture which is of pH 9 and has a F:U molar ratio of 2.30:1, is stirred and heated to reflux. Aqueous sulphuric acid (20 ml; 15% $H_2SO_4$) is added, to bring the mixture to pH 2.0, and it is then heated under reflux for 30 minutes. Aqueous sodium hydroxide (14 ml; 20% w/v NaOH) is added while maintaining the reflux to bring the mixture to pH 7.4. The mixture is then evaporated in vacuo at about 40° C. to a solids content of 59%. Urea (46.2 g) is added to part of the evpaorated resin (190.3 g) to give a resin having a F:U molar ratio of 1.30:1. This resin is a water-soluble, colourless transparent liquid having a solids content of 66% and a viscosity at 25° C. of 0.55 Pa s.

EXAMPLE 6

Example 1 is repeated to the stage at which water is distilled from the mixture, to a solids content of 57%. To 100 parts by weight of the resulting mixture, 25.55 parts by weight of urea is added to give a resin having a F:U molar ratio of 1.25:1. This resin is a water-soluble colourless transparent liquid having a solids content of 66% and a viscosity at 25° C. of 0.32 Pa s.

EXAMPLE 7

Softwood core chips (1540 g), dried to a moisture content of 2%, are blended with a mixture comprising the resin described in Example 6 (172 g), ammonium chloride solution (12 g; 10% $NH_4Cl$), a commercial wax emulsion (12 g: 65% wax), and water (65 g). Part of the resultant blend (1650 g) is placed within a wooden frame 355 mm square, and consolidated at room temperature under a pressure of 791 kPa. The result consolidated sheet is removed from the frame and compressed at 145° C. for 8 minutes under a pressure of 2.77 MPa. The resultant chipboard (particle board) has a thickness of 19 mm. The board is tested, with the following results:

| | |
|---|---|
| F:U molar ratio | 1.25:1 |
| Resin content of board (% solids) | 8 |
| Density (kg/m$^3$) | 643 |
| Modulus of rupture (mPa) | 14.01 |
| Transverse tensile strength (mPa) | 0.54 |
| Total extractable formaldehyde (%) | 0.012 |

It can be seen that the total extractable formaldehyde, measured in accordance with BS 1811, in the board is extremely low.

EXAMPLE 8

Example 5 is repeated to the stage where the mixture is evaporated, the evaporation being carried out to give a solids content of 50% instead of 59%. The evaporated mixture has a viscosity at 25° C. of 0.08 Pa s. Urea (30 parts) is added to the evaporated mixture (200 parts) and the resulting mixture is stirred until the urea is dissolved, giving a mixture with a viscosity at 25° C. of 0.07 Pa s. The F:U molar ratio of the mixture is 1.57:1. The temperature of the mixture is adjusted, if necessary, to 34°–40° C. and aqueous sulphuric acid (1 part; 15% $H_2SO_4$) is added to bring the mixture to pH 3.9. The mixture is stirred for 30 minutes, the temperature rising to 50° C., samples being taken at regular intervals for viscosity determination, until the viscosity of the mixture is increased to 0.22 Pa s. Aqueous sodium hydroxide (0.4 part; 20% NaOH) is added to bring the mixture to pH 7. The mixture is then dehydrated in a spray drier to give a resin powder having a softening point of 133° C., a F:U molar ratio of 1.56:1 and a free formaldehyde content of 0.27%.

EXAMPLE 9

Aqueous formaldehyde solution (757.1 g; 38.50% HCHO) is treated with sodium hydroxide solution (2.4 ml; 10% NaOH) and urea (242.9 g). The mixture, which is of pH 9 and has a F:U molar ratio of 2.4:1, is stirred and heated to 80° C., at which temperature it is maintained for 15 minutes. Aqueous sulphuric acid (13.2 ml; 15% $H_2SO_4$) is added, to bring the mixture to pH below 3.5. The mixture is cooled to 80° C. and heated at this temperature for 30 minutes. Aqueous sodium hydroxide (10% NaOH) is then added to bring the mixture to pH 7. The mixture is then evaporated in vacuo at about 40° C. to a solids content of 59%. Urea (201 g) is added to the evaporated resin (695 g) to give a resin having a F:U molar ratio of 1.3:1. This resin is a water-soluble, colourless transparent liquid having a solids content of 65% and a viscosity at 25° C. of 0.5 Pa s.

EXAMPLE 10

Aqueous formaldehyde solution (784.6 g; 38.5% HCHO) is treated with sodium hydroxide solution (2.4 ml; 10% NaOH), and urea (215.6 g). The mixture, which is of pH 9 and has a F:U molar ratio of 2.8:1, is stirred and heated to reflux temperature, where it is maintained for 15 minutes. An aqueous solution of sulphuric acid (6.6 ml; 15% $H_2SO_4$) is added. The resulting mixture, which is of pH 2.7, is heated under reflux for 30 minutes.

Whilst maintaining the reflux, aqueous sodium hydroxide solution (10% NaOH) is added to give a neutral solution (pH 7). This solution is evaporated in vacuo at 40° C. to a solids content of 59%, urea is added to give a F:U molar ratio of 1.25:1, and the mixture is stirred for 60 minutes.

This resin is a water-soluble, colourless transparent liquid having a solids content of 65% and a viscosity at 25° C. of 0.1 Pa s.

I claim:

1. A process for the preparation of urea-formaldehyde resins which comprises
    (i) mixing an aqueous formaldehyde solution containing 30–50% by weight of formaldehyde with urea at a formaldehyde: urea molar ratio of 2 to 3:1 and at pH 6–11,
    (ii) heating the mixture to at least 50° C.,
    (iii) adding an acid until the mixture reaches a pH within the range 0.5–3.5,
    (iv) heating the mixture at a temperature between 80° C. and the reflux temperature,
    (v) with the mixture at a temperature of at least 80° C., adding a base until the mixture reaches a pH within the range 6.5–9, and
    (vi) adding urea until the formaldehyde:urea molar ratio is within the range 0.8–1.8:1.

2. A process according to claim 1, in which the initial formaldehyde:urea molar ratio is within the range 2.2 to 2.8:1.

3. A process according to claim 2, in which the initial formaldehyde:urea molar ratio is within the range 2.3 to 2.5:1.

4. A process according to any of claims 1 to 3, in which the heating stage (ii) is effected to a temperature of at least 80° C.

5. A process according to claim 1, in which acidification in stage (iii) is effected to pH 1–2.5.

6. A process according to claim 1 in which the heating stage (iv) is effected at reflux temperature.

7. A process according to claim 1, in which the heating stage (iv) is effected for a period of from 15 minutes to 1 hour.

8. A process according to claim 1, in which the mixture is evaporated under reduced pressure, either between stages (v) and (vi) or after stage (vi), until the solids content is within the range 40–75% by weight.

9. A process according to claim 8, in which the evaporation precedes the urea addition stage (vi) and is effected to give a solids content within the range 50–65% by weight.

10. A process according to claim 8, in which the evaporation follows the urea addition stage (vi) and is effected to give a solids content within the range 60–70% by weight.

11. A process according to claim 1, in which addition of urea in stage (vi) gives a product having a formaldehyde:urea molar ratio within the range 1.0 to 1.7:1.

12. A process according to claim 11, in which the urea addition gives a product having a formaldehyde:urea molar ratio of 1.2 to 1.5:1.

13. A process for the preparation of a solid particulate urea-formaldehyde resin which comprises
    (i) mixing an aqueous formaldehyde solution containing 30–50% by weight of formaldehyde with urea at a formaldehyde:urea molar ration of 2 to 3:1 and at pH 6–11,
    (ii) heating the mixture to at least 50° C.,
    (iii) adding an acid until the mixture reaches a pH within the range 0.5–3.5,
    (iv) heating the mixture at a temperature between 80° C. and the reflux temperature,
    (v) with the mixture at a temperature of at least 80° C., adding a base until the mixture reaches a pH within the range 6.5–9,
    (b) reacting the mixture from step (v) with urea at a pH below 7 to increase the viscosity thereof,
    (c) adding a base until the mixture reaches a pH within the range 6.5–9, and
    (d) dehydrating the mixture to form a solid particulate resin.

14. A process according to claim 13, in which step (b) is carried out at a pH of 3 to 5 and a temperature of 30 to 60° C., using urea in an amount sufficient to give the reaction mixture a formaldehyde:urea molar ratio of from 1.3:1 to 1.9:1 until the viscosity of the reaction mixture is 2 to 4 times the initial viscosity thereof.

15. A process according to claim 14, in which step (b) is carried out at a pH of 3.5 to 4.5 and a temperature of 35 to 50° C., using urea in an amount sufficient to give the reaction mixture a formaldehyde:urea molar ratio of from 1.5:1 to 1.7:1, until the viscosity of the reaction mixture is 2.5 to 3.5 times the initial viscosity thereof.

16. A process according to claim 13, 14 or 15, in which the mixture reacted with urea has a solids content of from 40 to 65% by weight.

17. A binder comprising a solid particulate resin obtained by a process according to claim 13 and a solid hardener therefor.

18. A bonded lignocellulosic material comprising as binder a resin obtained by a process according to claim 13, said resin being in cured form.

19. A process for bonding two lignocellulosic surfaces together which comprises applying to at least one of the surfaces a resin prepared by a process according to claim 13 and holding the surfaces together while curing the resin.

20. A process according to claim 19, in which fibreboard or particle board is produced by mixing lignocellulosic fibres or particles together with the said binder comprising a resin and, optionally, a heat-activated hardener therefor and heating the resulting mixture under pressure until the binder is cured.

* * * * *

UNITED STATES PATENT AND TRADEMARK OFFICE
CERTIFICATE OF CORRECTION

PATENT NO. : 4,968,772

DATED : November 6, 1990

INVENTOR(S) : Ian Robert Whiteside

It is certified that error appears in the above-identified patent and that said Letters Patent is hereby corrected as shown below:

On the title page:
Item [45] before "Nov. 6, 1990" delete the asterick.

Item [*] Notice: Delete "The portion of the term of this patent subsequent to May 3, 2010, has been disclaimed."

Signed and Sealed this

Third Day of March, 1992

Attest:

HARRY F. MANBECK, JR.

Attesting Officer

Commissioner of Patents and Trademarks